United States Patent [19]

Pieper et al.

[11] Patent Number: 5,122,359
[45] Date of Patent: Jun. 16, 1992

[54] PROCESS FOR REPROCESSING SULFURIC ACID FROM PHOSPHOROUS PURIFICATION

[75] Inventors: Werner Pieper, Kerpen; Walter Biermann, Frechen, both of Fed. Rep. of Germany

[73] Assignee: Hoechst Aktiengesellschaft, Frankfurt am Main, Fed. Rep. of Germany

[21] Appl. No.: 557,928

[22] Filed: Jul. 25, 1990

[30] Foreign Application Priority Data

Aug. 8, 1989 [DE] Fed. Rep. of Germany .... 3926112.3

[51] Int. Cl.$^5$ .................. C01B 17/44; C01B 17/90; C01B 25/01
[52] U.S. Cl. .................... 423/525; 423/322; 423/323; 423/531
[58] Field of Search ............... 423/522, 525, 526, 527, 423/531, 322, 323

[56] References Cited

U.S. PATENT DOCUMENTS

| | | | |
|---|---|---|---|
| 2,255,421 | 9/1941 | Groll et al. | 423/531 |
| 3,780,164 | 12/1973 | Muller et al. | 423/332 |
| 5,026,535 | 6/1991 | Jonsson et al. | 423/531 |

FOREIGN PATENT DOCUMENTS

| | | | |
|---|---|---|---|
| 17380 | 1/1936 | Australia | 423/525 |
| 107532 | 6/1939 | Australia | 423/531 |
| 0027607 | 4/1981 | European Pat. Off. | 423/531 |
| 49-35296 | 8/1974 | Japan | 423/531 |
| 58-32003 | 2/1983 | Japan | 423/531 |
| 45663 | 12/1938 | Netherlands | 423/531 |
| 601222 | 4/1978 | U.S.S.R. | 423/531 |
| 919989 | 4/1982 | U.S.S.R. | 423/323 |

*Primary Examiner*—Gary P. Straub
*Attorney, Agent, or Firm*—Connolly and Hutz

[57] ABSTRACT

A process for reprocessing sulfuric acid obtained in the purification of yellow phosphorous, which comprises mixing the contaminated sulfuric acid with hydrogen peroxide and reacting this mixture in a vessel containing hot concentrated sulfuric acid at 110° to 210° C. in the presence of $FeSO_4$, $MnSO_4$ or $NiSO_4$ as a catalyst is described.

4 Claims, No Drawings

PROCESS FOR REPROCESSING SULFURIC ACID FROM PHOSPHOROUS PURIFICATION

The present invention relates to a process for reprocessing sulfuric acid obtained in the purification of yellow phosphorus.

The yellow phosphorus prepared electrothermically in a relatively high purity on a large industrial scale does not comply with the purity requirements for specific forms of use, for example production of semiconductors, phosphors and getter material.

A process for the purification of yellow phosphorus by means of sulfuric acid is described in U.S. Pat. No. 3,780,164. The black-colored dilute $SO_2$-containing sulfuric acid obtained in this purification process still contains residual amounts of elemental phosphorus, phosphoric acid and phosphorous acid. Because of these impurities, this sulfuric acid presents the expert with major problems in its reprocessing or disposal.

The object was thus to provide a process for reprocessing the sulfuric acid obtained in the purification of yellow phosphorus which has preferably been prepared electrothermally.

Specifically, the process of the invention thus comprises mixing the contaminated sulfuric acid with hydrogen peroxide and reacting this mixture in a vessel containing hot concentrated sulfuric acid at 110° to 210° C. in the presence of a catalyst.

The process of the invention furthermore comprises, preferably and if appropriate, a) using $FeSO_4$, $MnSO_4$ or $NiSO_4$ as the catalyst;

b) mixing the contaminated sulfuric acid with 100 to 400 g of hydrogen peroxide as a 20 to 35% strength aqueous solution per kg of sulfuric acid;

c) keeping the sulfuric acid in the vessel at a sulfuric acid concentration of more than 60% by weight, in particular 75 to 85% by weight;

d) keeping the sulfuric acid in the vessel at a temperature of 160° to 190° C.; and e) mixing the reprocessed sulfuric acid with 2 to 20 g of hydrogen peroxide as a 20 to 35% strength by weight aqueous solution per kg of reprocessed sulfuric acid at a temperature of 100° to 160° C. in a subsequent decolorizing reaction.

The reprocessed sulfuric acid can be used for breaking down phosphate ores for the preparation of wet phosphoric acid or phosphate fertilizers.

The sulfuric acid obtained in the purification of electrothermally prepared yellow phosphorus is an approximately 50 to 70% strength by weight sulfuric acid. Since sulfuric acid concentrations of more than 60% by weight are required for the sulfuric acid reprocessing according to the invention, concentrated sulfuric acid must be initially introduced into the vessel if the contaminated sulfuric acid has a low concentration. Moreover, additional water is introduced into the process with the hydrogen peroxide.

The amount of catalyst added is not critical. It has been found that 20 to 200 mg of catalyst per kg of reprocessed sulfuric acid are completely adequate. Larger amounts of catalyst are undesirable as impurities if the reprocessed sulfuric acid is employed for the preparation of wet phosphoric acid.

EXAMPLE 1

50 kg of 96% pure sulfuric acid and 1.5 g of $FeSO_4$ are initially introduced into an enameled double-walled reactor with a stirrer and are heated up to 130° C. The supply of heat is then stopped and a mixture of 25 kg of 68% strength by weight contaminated sulfuric acid and 7.5 kg of 35% strength by weight hydrogen peroxide is metered in over a period of 1 hour, while stirring. The reaction is carried out at a temperature of 180° C. without further supply of heat. The table shows the degree of purification. The reprocessed sulfuric acid has a yellow coloration. The acid was of neutral smell.

TABLE

| Impurities | Feed acid [% by weight] | Reprocessed acid [% by weight] |
| --- | --- | --- |
| Carbon (total) | 1.3 | 0.04 |
| Phosphorus (total) | 0.27 | 0.08 |
| Phosphorus (elemental) | 0.041 | <0.0001 |
| Pohsphorus oxides | 0.23 | 0.08 |
| Concentration of $H_2SO_4$ | 68 | 82 |

EXAMPLE 2

1.5 kg of the sulfuric acid reprocessed according to Example 1 were metered into 7.5 g of 35% strength by weight hydrogen peroxide at 160° C. After cooling, the sulfuric acid had only a slight yellow hue.

COMPARISON EXAMPLE 3

A mixture of 25 kg of 68% strength by weight contaminated sulfuric acid, 7.5 kg of 35% strength by weight hydrogen peroxide and 1.0 g of $FeSO_4$ was heated to 180° C. in an enameled double-walled reactor with a stirrer in the course of ½ hour, while stirring, and was kept at this temperature for a further hour.

The sulfuric acid treated in this way was black-colored and smelled tarry.

COMPARISON EXAMPLE 4

Comparison Example 3 was repeated with the modification that a mixture of 8 kg of 68% strength by weight contaminated sulfuric acid and 17 kg of 96% strength by weight sulfuric acid was reprocessed as the contaminated sulfuric acid.

The dark-colored sulfuric acid mixture became black in color during the reaction and smelled tarry.

We claim:

1. A process for reprocessing the sulfuric acid obtained in the purification of yellow phosphorus, which comprises mixing the contaminated sulfuric acid with 100 to 400 g of 25 to 35% by weight aqueous hydrogen peroxide per kg of contaminated sulfuric acid and adding this mixture to a vessel containing sulfuric acid at a concentration of 60 to 85% by weight at 110° to 210° C. in the presence of 20 to 200 mg $FeSO_4$, $MNSO_4$ or $NiSO_4$ per kg contaminated sulfuric acid as a catalyst while keeping the acid concentration in the vessel at 60 to 85%.

2. The process as claimed in claim 1, wherein the sulfuric acid in the vessel is kept at a sulfuric acid concentration of 75 to 85% by weight.

3. The process as claimed in claim 1, wherein the sulfuric acid in the vessel is kept at a temperature of 160° to 190° C.

4. The process as claimed in claim 1, wherein the reprocessed sulfuric acid is mixed with 2 to 20 g of 20 to 35% by weight aqueous hydrogen peroxide per kg of reprocessed sulfuric acid at a temperature of 100° to 160° C. in a subsequent decolorizing reaction.

* * * * *